US006714563B1

(12) United States Patent
Kushi

(10) Patent No.: US 6,714,563 B1
(45) Date of Patent: *Mar. 30, 2004

(54) NETWORK CLOCK SYNCHRONIZATION SCHEME

(75) Inventor: David M. Kushi, San Jose, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,829

(22) Filed: Apr. 26, 1999

(51) Int. Cl.[7] .................................................. H04J 3/06
(52) U.S. Cl. ........................................ 370/503; 370/254
(58) Field of Search ............................ 370/351, 395.62, 370/503, 509, 510, 511, 254, 256; 713/400, 401

(56) References Cited

U.S. PATENT DOCUMENTS

| | | | |
|---|---|---|---|
| 4,837,850 A | * 6/1989 | Maisel et al. | 340/825.2 |
| 4,939,752 A | * 7/1990 | Literati et al. | 370/238 |
| 5,361,277 A | * 11/1994 | Grover | 327/141 |
| 5,386,418 A | * 1/1995 | Komuro et al. | 375/356 |
| 5,475,717 A | * 12/1995 | Cordonnier et al. | 375/356 |
| 5,608,649 A | * 3/1997 | Gopinath et al. | 709/242 |
| 5,734,687 A | * 3/1998 | Kainulainen | 370/216 |
| 5,838,659 A | * 11/1998 | Kainulainen | 370/216 |
| 5,886,996 A | * 3/1999 | Wolf | 370/507 |
| 6,115,825 A | * 9/2000 | Laforge et al. | 713/201 |
| 6,185,216 B1 | * 2/2001 | Chapman | 370/402 |
| 6,317,475 B1 | * 11/2001 | Kasurinen | 375/356 |
| 6,567,422 B1 | * 5/2003 | Takeguchi et al. | 370/503 |

FOREIGN PATENT DOCUMENTS

| | | | |
|---|---|---|---|
| EP | 0 450 828 | * 10/1991 | H04J/3/06 |
| WO | WO 95/24801 | * 9/1995 | |

OTHER PUBLICATIONS

Mils, David. "Internet Time Synchronization: The Network Time Protocol". IEEE Transactions on Communications. vol. 39, Issue 10. Oct., 1991. pp. 1482–1493.*

(List continued on next page.)

*Primary Examiner*—Chi Pham
*Assistant Examiner*—Derrick W Ferris
(74) *Attorney, Agent, or Firm*—Blakely, Sokoloff, Taylor & Zafman LLP

(57) ABSTRACT

A clock distribution tree for a digital network is automatically established through the use of spanning tree computations at nodes of the network. The computations rely, at least in part, upon the exchange of clock distribution messages between the nodes of the network. Each clock distribution message includes information regarding a clock source available at the source node of the message. The clock distribution tree is hierarchical in nature, with nodes that are lower in the hierarchy (i.e., at a higher stratum level) extracting clock from links with nodes that are higher in the hierarchy (i.e., at a lower stratum level); this helps preserve the synchronous digital hierarchy of the network. The spanning tree computations involve a root selection process and a convergence test. The root selection process is made on the basis of configuration vectors exchanged as part of the clock distribution messages. The configuration vectors include a port priority, a node stratum level and a primary reference source identifier. The convergence test includes determining whether a number of clock distribution messages received or transmitted equals a network maximum diameter parameter for the network.

76 Claims, 7 Drawing Sheets

| | |
|---|---|
| Protocol ID | 62 |
| Version | 64 |
| Message Type | 66 |
| Modifiers | 68 |
| Root Clock Source Priority | 70 |
| Root Clock Source Stratum | 72 |
| Root Clock Source PRS | 74 |
| Root Clock Switch Stratum | 76 |
| Root Clock Source Address | 78 |
| Path Cost to Root | 80 |
| Tx Clock Source Priority | 82 |
| Tx Clock Source Stratum | 84 |
| Tx Clock Source PRS | 86 |
| Tx Node Stratum | 88 |
| Tx Clock Source Address | 90 |
| Tx Port ID | 92 |
| Message Age | 94 |
| Maximum Age | 96 |
| Hello Time | 97 |
| Reserved | 98 |

60

OTHER PUBLICATIONS

Mills, David. "Simple Network Time Protocol (SNTP)". Network Working Group RFC 2030. Oct., 1996.*

Garcia–Luna–Aceves, et al. "A Path–Finding Algorithm for Loop–Free Routing". IEEE/ACM Transactions on Networking. Feb., 1997. pp. 148–160.*

Bellcore, "Digital Network Synchronization Plan" Generic Requirements GR–436–CORE, Issue 1, Jun. 1994, 88 pages.

American National Standard "For Telecommunications—Synchronization Interface Standard", ANSI T1.101.1999, 58 pages, Developed by the Standard Committee T1–Telecommunications, American National Standards Institute, New York.

Bellcore, "Clocks For the Synchronized Network: Common Generic Criteria, Alarms, Reports and Control Commands", Issue 2, Dec. 2000, Section 8, pp. 8–1 to 8–6.

* cited by examiner

NETWORK CLOCK SYNCHRONIZATION SCHEME

FIELD OF THE INVENTION

The present invention relates to the field of synchronous networks and, in particular, relates to a scheme for synchronizing a network to, a common clock reference that finds particular usefulness in networks that have inherent synchronization requirements, for example networks configured to transport voice and video information.

BACKGROUND

In modern telecommunications and data communication networks, digital switching and transmission systems are used to transport voice, video and/or data information between intermediate network nodes and end-users. These digital switching and transmission systems must be accurately synchronized with one another to prevent impairments such as jitter, wander and phase transients. By synchronization, it is meant that the digital switching and transmission systems must operate at a common clock rate. As noted in Bellcore Generic Requirements Document GR-436-CORE, entitled "Digital Network Synchronization Plan", Jun. 1, 1994, this characteristic is more accurately termed "syntonization" (meaning at the same frequency). However, the term synchronization has become accepted in the industry and will be used herein.

To ensure that the common clock rate is maintained between nodes of a network, so-called synchronized networks are built. Within these networks, synchronization references that are traceable to a highly accurate clock source (a so-called Primary Reference Source or PRS), for example as may be obtained from one or more Global Positioning System (GPS) satellites and/or ground stations, are passed among the nodes. Generally, these synchronization references are passed in a hierarchical fashion, with downstream nodes in the hierarchy receiving the references from upstream nodes. Within the hierarchy of the network, the PRS is located at the highest level (also known as the lowest stratum) and all the timing references are traceable thereto.

In the past, establishing this hierarchy through which the synchronization references are passed has required network administrators to manually configure each node of the network so as to indicate the clock source to be used by that node. For networks of any appreciable size, this is a nontrivial process and it is complicated by the need to specify backup clock sources to be used in the event of a node or transmission link failure. Thus, it would be desirable to automate this process of establishing the synchronization hierarchy.

SUMMARY OF THE INVENTION

In one embodiment, a clock distribution tree for a digital network is automatically established through the use of spanning tree computations at nodes of the network. The computations rely, at least in part, upon the exchange of clock distribution messages between the nodes of the network. Each clock distribution message includes information regarding a clock source available at the source node of the message. The clock distribution tree is hierarchical in nature, with nodes that are lower in the hierarchy (i.e., at a higher stratum level) extracting clock from links with nodes that are higher in the hierarchy (i.e., at a lower stratum level).

The spanning tree computations involve a root selection process and a convergence test. The root selection process is made on the basis of configuration vectors exchanged as part of the clock distribution messages. The configuration vectors may include a priority value for a clock source, a stratum level and primary reference source identifier for that clock source, a stratum level of a node transmitting the message and the network address of that node. The convergence test includes determining whether a number of clock distribution messages received or transmitted equals a network maximum diameter parameter for the network.

A further embodiment provides a method for automatically selecting, at a node of a digital network, a clocking source for that node. The selection is made according to a comparison of clock source configuration vectors, each vector associated with a port in the network and each vector identifying the associated port's priority, a stratum level of a clock source available at that port and an indication of a primary reference clock source for that port. The clock source configuration vectors are exchanged between nodes of the network as part of a configuration message. In some cases, one of the configuration vectors may be associated with a virtual node of the network.

Each node of the network is preferably configured to extract clock information only from links to adjacent nodes at an equal or lower stratum level. For example, nodes may be configured to examine portions of the configuration messages to determine the stratum level of the transmitting node and thereby determine whether to link to the node is a candidate link for extracting clock. This helps preserve the synchronous digital hierarchy of the network.

The above methodologies and processes may, in some cases, be embodied as a set of computer-readable instructions to be executed by a processor of a network node. Thus, the processor may establish the clock distribution tree for the node and program the nodes clock hardware accordingly. Of course, other features and advantages of the present scheme will be apparent upon a review of the detailed description below and its accompanying drawings.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
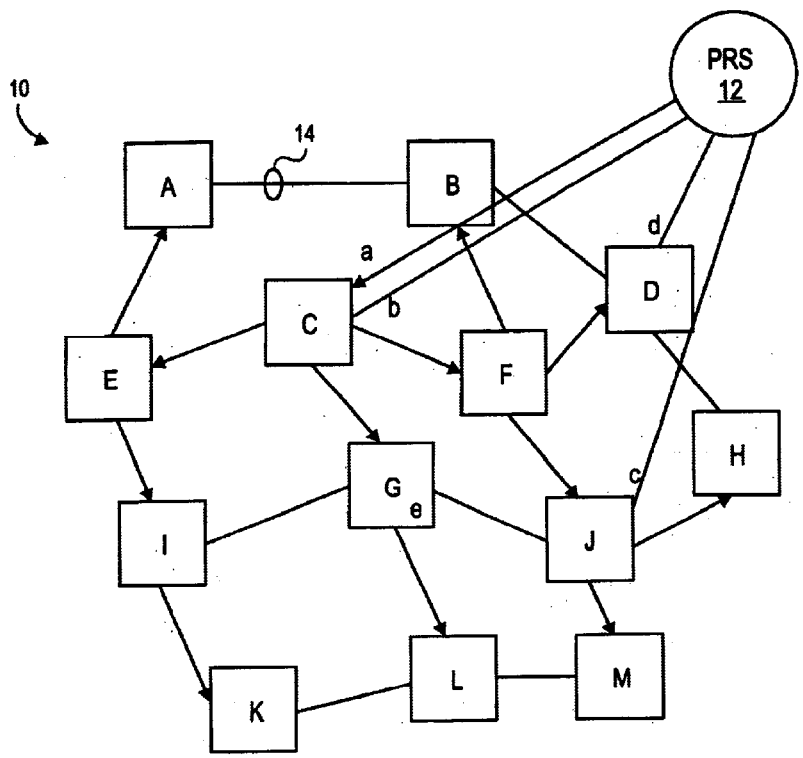
FIG. 1 illustrates an example of a digital network having nodes configured to automatically construct a clock distribution tree in accordance with the present methods.

Described herein is a scheme for automatically synchronizing a network of participating nodes with a reference clock. By utilizing the methods and apparatus discussed below, the reference clock signal may be distributed among the nodes, and indeed through each individual node where needed, to ensure synchronized network operation. In one particular embodiment, participating nodes of a network are provided with instances of a network clocking software package (e.g., groups of computer-readable instructions) that is configured to provide the functionalities described below to achieve network synchronization. These software instances may reside on computer-readable media (e.g., non-volatile memory or the like) housed within the nodes, and may be executed by processing units of the nodes to accomplish synchronization operations (e.g., to program the relevant portions of the node's hardware resources to extract clock from a designated source). As will become evident, these software instances are configured to communicate with one another for the purpose of ensuring such synchronization.

It should be remembered, however, that the above-described software instances are but one instantiation of the broader concepts that make up the present invention. Further some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing, "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Thus, in the following discussion references to the exemplary software instances of the network clocking scheme should not be read to limit the broader spirit and scope of the invention as recited in the appended claims.

FIG. 1 illustrates an example of a network 10 that has been synchronized with respect to an external PRS 12 in accordance with the present synchronization scheme. Network 10 includes a number of nodes A–M, each having a number of ports. The nodes are communicatively coupled to one another via communication links 14. Note that for sake of clarity, only one such communication link 14 has been labeled, however, each such link may be substantially similar to the others. In the figure, the arrows represent the directed edges of a clock distribution graph or tree, which was constructed in accordance with the present synchronization scheme.

To better understand how the synchronization graph was constructed, consider that within network 10 configuration of the clocking sources is done on a port basis. That is, selection of a clocking source at each node A–M is based on a configuration vector associated with each port of that node. The configuration vector may be made up of a number of components, including the priority of a clock source associated with the port, the stratum level of that clock source, the PRS identifier of the clock source, the stratum level of the node generating the message in which the configuration vector is conveyed, and the network address of that node. Thus, one exemplary vector may be v:=<clock source priority, clock source stratum level, prs id of clock source, stratum level of transmitting node, network address of transmitting node>.

In the current synchronization scheme, clock sources are modeled as clock source ports. A port's priority may be determined by a network administrator. Further, because the internal oscillator of a network node could be used as a root clock source (i.e., the source at the lowest stratum or highest layer of the hierarchy), such internal oscillators are considered as virtual ports. The stratum level of a clock source is defined by the above-cited Bellcore reference and determines where in the network hierarchy the clock resides. Briefly, a clock's stratum level depends upon its free-run accuracy, holdover stability and its ability to achieve or maintain synchronization with a reference that may be off-frequency ("pull-in/hold-in"). Detailed requirements for clocks operating at various stratum levels may be found in Bellcore Document. TR-NWT-001244, "Clocks for the Synchronized Network: Common Generic Criteria" (Issue 1, June 1993), incorporated herein by reference. As with a port's, priority, a clock's stratum level may be specified by a network.

In one embodiment, the prs id value for the configuration vector may be one of two values (e.g., 0 or 255), depending upon whether the clock source is associated with an external clocking source or an internal clocking source. The prs id is intended to be used when multiple clocks are being used to synchronize networks, as is the case many times when international boundaries are crossed. In some cases, all external clocking sources may be deemed to be traceable to the same PRS. Thus, for the example given in FIG. 1, the configuration vectors associated with clock source ports a–e may be expressed as:

a:=<1,2,0, stratum level of node C, address of node C>;
b:=<1,3,0, stratum level of node C, address of node C>;
c:=<2,2,0, stratum level of node J, address of node J>;
d:=<3,3,0, stratum level of node D, address of node D>; and
e:=<4,4,255, stratum level of node G, address of node G>.

Figure 2:
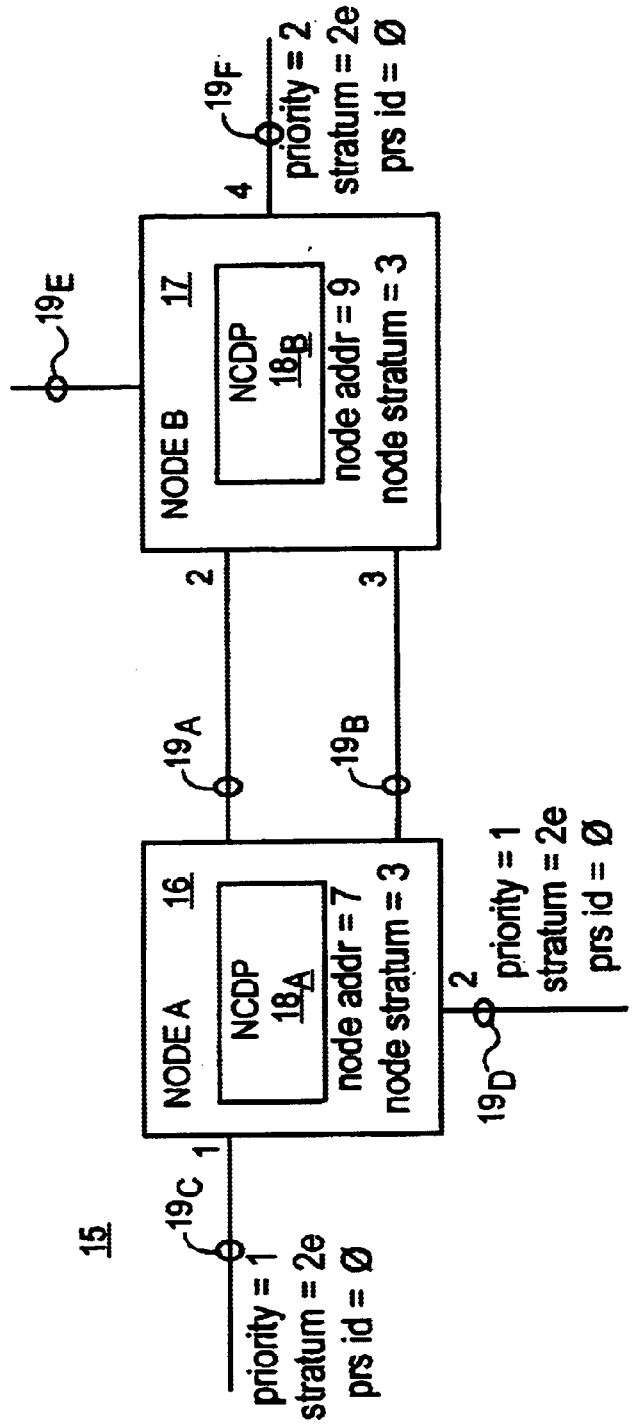
FIG. 2 illustrates an example of a network having nodes configured with network clock distribution software configured in accordance with the present scheme.

By way of further example, consider the network illustrated in FIG. 2. Network 15 includes node A 16 and node B 17. In some cases, these nodes 16 and 17 may be switches. Each node 16 and 17 is configured with an instance of the present network clock distribution protocol (NCDP) software $18_A$ and $18_B$, respectively. The nodes 16 and 17 are communicatively coupled by links $19_A$ and $19_B$ and node A 16 is further coupled to other nodes of the network trough links $19_C$ and $19_D$, while node B 17 is coupled to other nodes of the network through links $19_E$ and $19_F$.

Node A 16 has a network address 7 and node B 17 has a network address 9, each of which, may be assigned by a network administrator in the conventional fashion. These addresses may take on any value, so long as they are unique from other node addresses in the network. Further, each node has an associated stratum level. Usually, this stratum level is a statement concerning the node's installed network clock hardware. In the example shown in FIG. 2, both nodes 16 and 17 are stratum 3 switches. In some implementations, the NCDP software may be configured to examine a node's installed network clock hardware and set the switch stratum level accordingly. This automatically determined value may be subsequently overridden by a network administrator.

In network 15, a network administrator has configured three of the links as clock sources for use by the NCDP instances $18_A$ and $18_B$. Two of these links, $19_C$ and $19_D$, are available at node A 16 and one of these links, $19_F$, is available at node B 17. Because each of the configured clock sources on these links is associated with an external source, the NCDP software sets the prs id of each clock source to 0.

For node A 16, links 19C and 19D have been configured by the network administrator as having the same priority and stratum. However, when node A 16 advertises an available clock source to other nodes, only one of these clock sources will be advertised, thus the node must select one (and only one) of these clock sources. In accordance with the procedures described below, the NCDP instance $18_A$ associated with the node will select the clock source associated with port 1 (i.e., link $19_C$) over that associated with port 2, because of the lower port number.

Now, and again these concepts are described in detail below, node A 16 will advertise that it has the "best" clock source available in the network (the priority 1 clock source is better than the priority 2 source available at node B 17). Thus, rather than utilize the priority 2 source from link $19_F$, node B 17 chooses to extract clock from one of the links, $19_A$ and $19_B$, coupling it to node A 16. In this example, both links are equally good, so in accordance with the present scheme node B 17 chooses to extract clock from the link having the lower port number (i.e., link $19_A$ associated with port 2).

In the above example, a network administrator could have forced node B 17 to extract clock from link $19_B$ associated with port 3 by configuring the administrative weight associated with port 3 to be higher than that associated with port 2. When the NCDP software initializes, it configures the administrative weight parameter of each port to a default value. The spanning tree algorithm discussed below uses this parameter during tree computation. Thus, by revising administrative weight values to be other than the default value, a network administrator can affect the resulting clock distribution tree to be computed.

Generally then, the present synchronization scheme determines the root clock source for the network by comparing the various source configuration vectors, first by examining the port priority. In one embodiment, the port having the highest priority is selected as the root clock source. In the event two or more ports have the same priority, comparisons are made at the stratum level, with the port associated with the configuration vector having the lowest stratum number (i.e., being at the highest layer in the network hierarchy) being selected. If a tie still exists, then a comparison of the clock sources is made, with external clock sources being selected over internal clock sources. In the event a tie still exists, the port associated with the vector having the highest associated network address is chosen. Note, if two ports on the same node are configured with the same priority and stratum level, the tie-breaker may be the port index and the node will only advertise its best clock source (so selected) to the other nodes of the network.

Thus, for the example shown in FIG. 1 the port on node C with configuration vector "a" will be selected (in accordance with the present methods) as the root of the network clock distribution tree. The port associated with vector "a" has the same priority as that for vector "b", but it has a lower stratum number. Hence, it is selected over the port associated with vector "b". In the event that the link associated with this port or the reference clock source available on this link fails or degrades to the point where it is unusable however, node C may either immediately switch to its next best locally configured clock source, run in holdover mode (if the underlying platform supports such operation) until it can switch over to the port that is associated with configuration vector "b", or use a local oscillator until a new clock distribution tree is constructed. Holdover is a mode where the network clock hardware of a node has accumulated sufficient information about the clock it is extracting, such that if that clock source is lost (e.g., due to a failed communication link) then, loosely speaking, the node can faithfully reproduce the lost clock.

If the link associated with vector "b" fails, the network clock distribution tree will be automatically reconstructed so that it is rooted at the port on node J that is associated with vector "c", the vector having the next highest port priority. Should that link fail, the tree will be reconstructed so that it is rooted at the port associated with vector "d" on node D. If that link fails, the tree will be reconstructed so that it is rooted at the internal clock source located at node G and associated with vector "e". Finally, if this source is lost, the present scheme will reconstruct the clock distribution tree so that it is rooted at the node having the lowest network address (e.g., ATM address constructed from media access control layer addresses and/or vendor assigned information may be used for the case of an ATM network).

Figure 3:
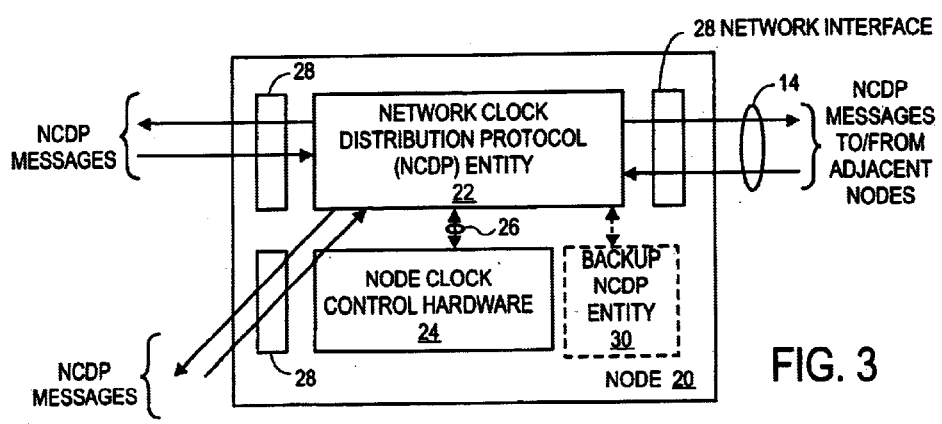
FIG. 3 illustrates an example of a network node configured with network clock distribution software configured in accordance with the present scheme.

FIG. 3 illustrates the interfaces shared between an instance (or entity) of the NCDP software and other software and hardware components of each node 20 and adjacent nodes in a network. Each NCDP software instance 22 interacts with the network clock hardware 24 of its node 20 through an interface 26. This interface may have one or more network clock drivers associated with it and allows the NCDP software entity 22 to control and configure the network clock hardware 24 through various registers. In this way, the network clock control hardware may be programmed to extract clock from a port chosen in accordance with the methods described below.

Each NCDP instance 22 also communicates with similar instances on adjacent nodes of the network through the use of NCDP messages (e.g., configuration PDUs) passed across network interfaces 28. When used in an ATM network, for example, the NCDP instances 22 may use the well known ATM Adaptation Layer 5 (AAL5) as the transport protocol between nodes. In such cases, NCDP instances 22 of adjacent nodes may communicate over designated virtual channel (VC) to exchange these NCDP messages. The segmentation and reconstruction (SAR) resources needed to construct ATM cells from the PDUs for transport according to the AAL5 protocol may be shared with other node components and used in the typical fashion. Also, in some cases backup instances 30 of the NCDP software instances (e.g., that may be associated with hot standby control cards for node 20) may communicate with the primary NCDP instance 22, in order to mirror network clocking state information. Thus, in the event of a failure of the control card associated with the primary NCDP instance 22, the backup control card may take over with no loss of network clock information.

Note that network clocking operates only on physical ports, so there is no need logically interconnect NCDP instances 22 in adjacent nodes using, for example, VP tunnels. Communication between NCDP instances 22 of adjacent nodes may be established on any link that is enabled for use by the network clocking software. Thus, any eligible link that is enabled by the software is a candidate link for clock extraction. Of course it is true that certain types of media have no concept of (or facility for) synchronous clock recovery. For example, Ethernet does not have such facilities as it is an asynchronous scheme.

At the outset, the NCDP instance 22 for a node 20 is initialized (for example using priority and stratum information supplied by a network administrator using the simple network management protocol (SNMP)). This includes establishing a communication channel with other NCDP instances on adjacent nodes. After this initialization process, the NCDP instance 22 begins participating in the clock distribution process described below by propagating configuration PDUs through the node's operational interfaces 28.

During normal steady state operation, an NCDP instance 22 receives protocol messages from other nodes in the network. Upon receipt thereof, the messages are processed in accordance with the procedures discussed below. Configuration PDUs are transmitted at a specified "hello interval" (e.g., once every 250 msec). This hello time interval, as well as other configuration parameters of the NCDP software can be modified by a network administrator through the simple network management protocol (SNMP) as is done in the conventional fashion for programming other features of network nodes.

Figures 4, 5:
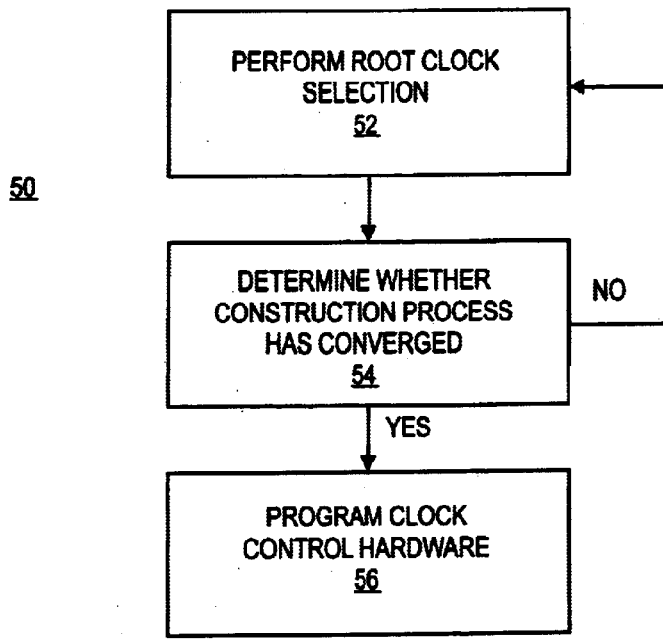
FIG. 4 illustrates the basic root selection and convergence test used by network nodes in the construction of a clock distribution tree in accordance with the present scheme.
FIG. 5 illustrates an example of a protocol data unit (PDU) exchanged between nodes of a network in accordance with the present scheme.

With these generalities in mind, the discussion turns now to the specifics by which the clock distribution tree is constructed. As shown in FIG. 4, the basic process 50 to be performed at each node 20 involves selecting (at each node) a root clock source (step 52). In one embodiment, the methodology for this root clock selection is based on a modified version of the spanning tree algorithm and protocol for network bridges promulgated in American National Standards Institute (ANSI)/Institute of Electrical and Electronic Engineers (IEEE) Standard 802.1d. The spanning tree algorithm is designed to designate a loop-free subset of a network's topology. It does so by recognizing that for any connected graph consisting of nodes and edges connecting pairs of, nodes, there must exist a spanning tree of edges that maintains the connectivity of the graph but contains no loops.

Briefly, the spanning tree computation specified by the 802.1d standard proceeds by iterations and begins with the selection of a root node in the network. Next, root ports on all other nodes are determined, with the root port of a node being the port through which the root node can be reached with the least aggregate path cost (called the root path cost). Finally, designated nodes and their designated ports are determined. A designated node is the node for each local area network (LAN) connected to the overall network that provides the minimum root path cost for that LAN. Only designated nodes are permitted to forward information to or from their respective LANs. A designated port is the port that connects a LAN to its designated node. These calculations require communication between the participating nodes, which communication is accomplished using protocol data units (PDUs). Note that the conventional spanning tree algorithm and protocol specified by the ANSI/IEEE does not accommodate the distribution of clock information in the manner contemplated by the present scheme.

By utilizing a modification of the 802.1d spanning tree algorithm, the present scheme inherits the fault tolerance and loop free operating characteristics of that algorithm. Such fault tolerant features are important for network clock distribution because the distribution tree should (indeed must if the network is to be useful) be reconfigurable in the event of the loss of one or more clocking sources. Loop free operation is desirable because the network should synchronize to a single clock source.

Thus, using the basic processes of the ANSI/IEEE 802.1d spanning tree algorithm (as modified), the present scheme first selects the root clock source (step 52 of FIG. 3), and then tests to determine whether the tree construction process has converged (step 54). Upon such convergence, the NCDP instance 22 at a node, programs its associated clock hardware (step 56). In other words, the NCDP software instructs the node's clock hardware to extract clock from the port selected during the tree construction process.

In the present scheme, the conventional ANSI/IEEE 802.1d spanning tree protocol is modified to change the root selection and designated port selection procedures to use a cost vector having, in one embodiment, five components <priority, stratum level, prs source, node stratum level, network address> that are associated with a clocking source. These clock source components are used instead of the traditional components <priority, bridge id> associated with a bridge. Each cost vector thus describes an associated clocking source. At each NCDP instance 22, cost vectors are compared starting with the priority components, with the cost vector having the lowest numerical value (in this example) representing the better clocking source.

To allow for such a comparison, the cost vectors are exchanged between the participating nodes of the network using PDUs that are modified versions of the PDUs used by the ANSI/IEEE 802.1d spanning tree protocol. The format of a configuration PDU for one embodiment of the present network clock distribution scheme is shown in FIG. 5. In PDU 60, the Protocol ID field 62 and Version field 64 identify the message as belonging to the relevant version of the present network clock distribution protocol. The Message Type field 66 identifies the message as a configuration message. Various Modifier Flags 68 may be used to indicate topology changes, virtual node addresses, etc.

Information regarding the root clock source for a node is conveyed in the next set of fields. The Root Clock Source Priority field 70 identifies the priority of the root clocking source. The Root Clock Source Stratum Level field 72 identifies the stratum level of the root clock source. The Root Clock Source Primary Reference Source Identifier field 74 specifies an administratively assigned value that identifies the source of the clock. As indicated above, one embodiment of the present scheme uses the value 0 to represent an external clock source and 255 to represent an internal clock source. The Root Node Stratum Level field 76 provides the stratum level rating of the node having the root clock source and the Root Clock Source Address field 78 indicates the network address of the node on which the root clock source port is located. The Path Cost to Root Clock Source field 80 specifies the path cost from the transmitting port to the root clock source.

The Transmitter Clock Source Priority field 82 indicates the priority of the best clocking source available and usable on the transmitting node. The Transmitter Clock Source Stratum Level field 84 provides the stratum level of the best clocking source and usable on the transmitting node. The Transmitter Clock Source PRS ID field 86 is an administratively assigned number that identifies the source of the clock. Again, 0 represents an external clock source while 255 represents an internal clock source. The Transmitting Node Stratum Level field 88 provides the stratum level of the transmitting node and the Transmitter Clock Source Address field 90 provides the network address of the transmitting node. The Transmitter Port ID field 92 specifies the port ID of the port that the transmitting node transmitted this message on.

Message Age field 94 may be used to indicate the age of the message. Maximum Age field 96 specifies the maximum allowable age value. Hello Time field 97 provides a "hello time" value. Other fields 98 of the configuration PDU 60 may be reserved for further functions.

The node that receives a configuration PDU must ensure that the synchronous digital hierarchy of the network is not violated. If a configuration PDU 60 is received that indicates that the stratum level of the transmitting node is higher than that of the receiving node, the information in the PDU will not be used to supersede that currently stored for the port on which the PDU was received. Thus, the receiving node ensures that those ports that receive configuration messages from adjacent nodes that are at a higher stratum (i.e., a lower layer in the network) are not chosen as that node's root port. Because the root port on a given node represents the communication link 14 that is used for clock extraction, this selection procedure ensures that a node will never extract clock from a node that resides at a higher strata in the network (recall that the PRS is at the lowest stratum layer).

As indicated above, each NCDP entity 22 begins by performing a root selection procedure. When an NCDP entity 22 that resides on a given node 20 has determined that a specified number of events (e.g., receptions and/or transmissions of configuration PDUs 60) has occurred (as may be determined by a maximum network diameter parameter specified by the network administrator), the node 20 determines that the selection process has converged and programs its associated clock control hardware 24 accordingly.

Figure 6:
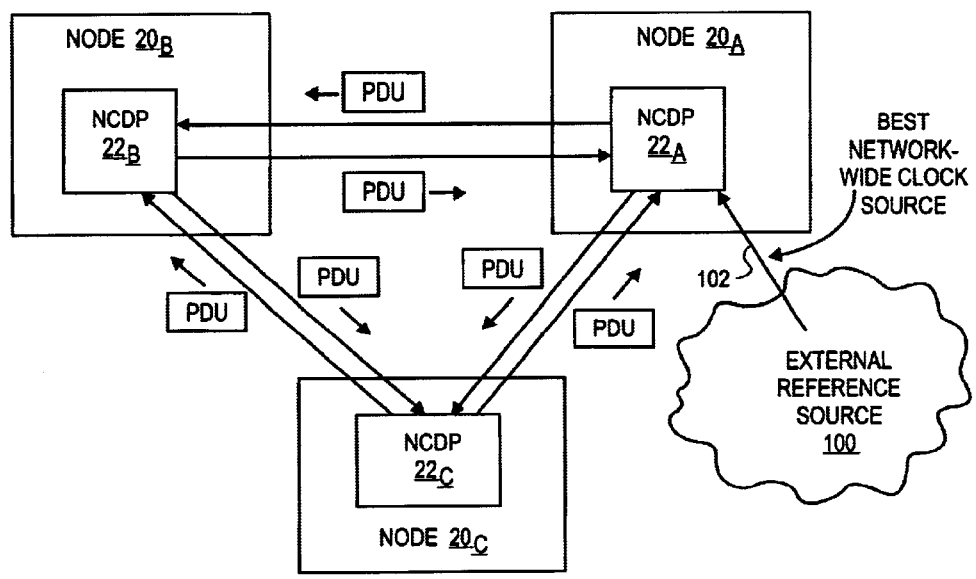
FIG. 6 illustrates an example of the exchange of PDUs within a network.

To illustrate, consider the situation depicted in FIG. 6. Here, the nodes $20_A$, $20_B$ and $20_C$ are each running an instance of the NCDP software ($22_A$, $22_B$ and $22_C$, respectively). The active NCDP instances are constantly exchanging configuration PDUs (e.g., at the hello interval) that contain information as to each node's knowledge of the best path to the root clock source. Initially, each node is in the unconverged state. However, node $20_A$, (i.e., the node that is directly attached to the best network wide clock source) will transition from the unconverged state to the converged state after it determines that it has been the root clock source for a number of times equal to the maximum network diameter parameter. This state may then be reflected in the configuration PDUs it exchanges with the other nodes by setting appropriate bits in the Modifier field 68. The remaining nodes $20_B$ and $20_C$ (i.e., those that are not directly attached to the best clock source) transition from unconverged to converged when each of the nodes determines that it has received a number of configuration PDUs equal to the maximum network diameter parameter that have the same root clock source (i.e., node $20_A$).

After recognizing that the selection process has converged, a node programs its underlying clock hardware. When this programming has been accomplished, the node may so notify its neighbors by setting an appropriate bit in the configuration PDU (e.g., in the Modifier field 68). In such cases, downstream nodes may be configured not to program their own clock hardware until receipt of a configuration PDU from an upstream node that indicates such successful programming.

If during steady,state operation a node determines that there has been a change in its local clock source (e.g., due to the failure of a communication link, etc.), the node enters an "unconverged" state and begins the selection process anew. The same may be true where a node initially becomes aware of a new clock source that is better than any source currently being used. To illustrate,.consider again the example shown in FIG. 6 and assume that nodes $20_B$ and $20_C$ are initially getting their clock from a source or sources other than the links attaching them to node $20_A$ (e.g., from internal oscillators). Assume now that the "best" network clock source (from the external network 100) is now enabled.

Immediately upon recognizing that the clock source from link 102 is better than any existing clock source (e.g., by a comparison of configuration vectors associated with the available clock sources), node $20_A$ will advertise this source to the other nodes by sending information about this source in configuration PDUs. Because this clock source is better than any existing clock source; being used by the remaining nodes, these nodes ($20_B$ and $20_C$) enter the unconverged state. Meanwhile, node 20A counts the number of times it advertises the newly available best clock source on its interfaces. So, after node $20_A$ advertises the "best" source to nodes $20_B$ and $20_C$, its count is "1".

Node $20_B$ will receive the PDU transmitted by $20_A$ concerning the availability of the "best" clock source on link 102 and (through a comparison of configuration vectors) determine that it is better than the node's currently clock source. Accordingly, node 20B will enter the unconverged state. This same process will occur at node $20_C$. Meanwhile, node 20A continues to propagate configuration PDUs advertising the "best" clock source to nodes 20B and 20C, each time incrementing its counter. Note, the counter is only incremented by 1 for each advertisement, regardless of the number of ports on which it is propagated. Every time the adjacent nodes (e.g., node 20B) receive a new advertisement regarding "best", they also increment their counters by 1, if that clock source is still the best source available to them.

The above process continues until the counter at node $20_A$ is equal to the maximum network diameter parameter set by the network administrator. At that point, node 20A recognizes that the criteria for convergence have been satisfied, programs its underlying clock hardware to extract clock from link 102 and changes to the converged state. Once the clock hardware programming is successfully completed, node 20A advertises this fact in future PDUs transmitted to the other nodes.

At the adjacent nodes (e.g., 20B and 20C), the above processes continue until their respective counters indicate that a number of PDUs advertising "best" that is equal to the maximum network diameter parameter have been received. At that point, the nodes change their states to converged and may optionally choose to program their respective clock hardware to extract clock from the link on which they were receiving these PDUs. Alternatively, the nodes may wait to program their respective clock hardware components until receiving a PDU from node $20_A$ indicating that node $20_A$ has successfully programmed its own clock hardware. Which of these options is invoked may depend upon initialization parameters specified by a network administrator. As each node successfully programs its associated clock hardware, this fact may be reported in PDUs sent by that node.

Figure 7:
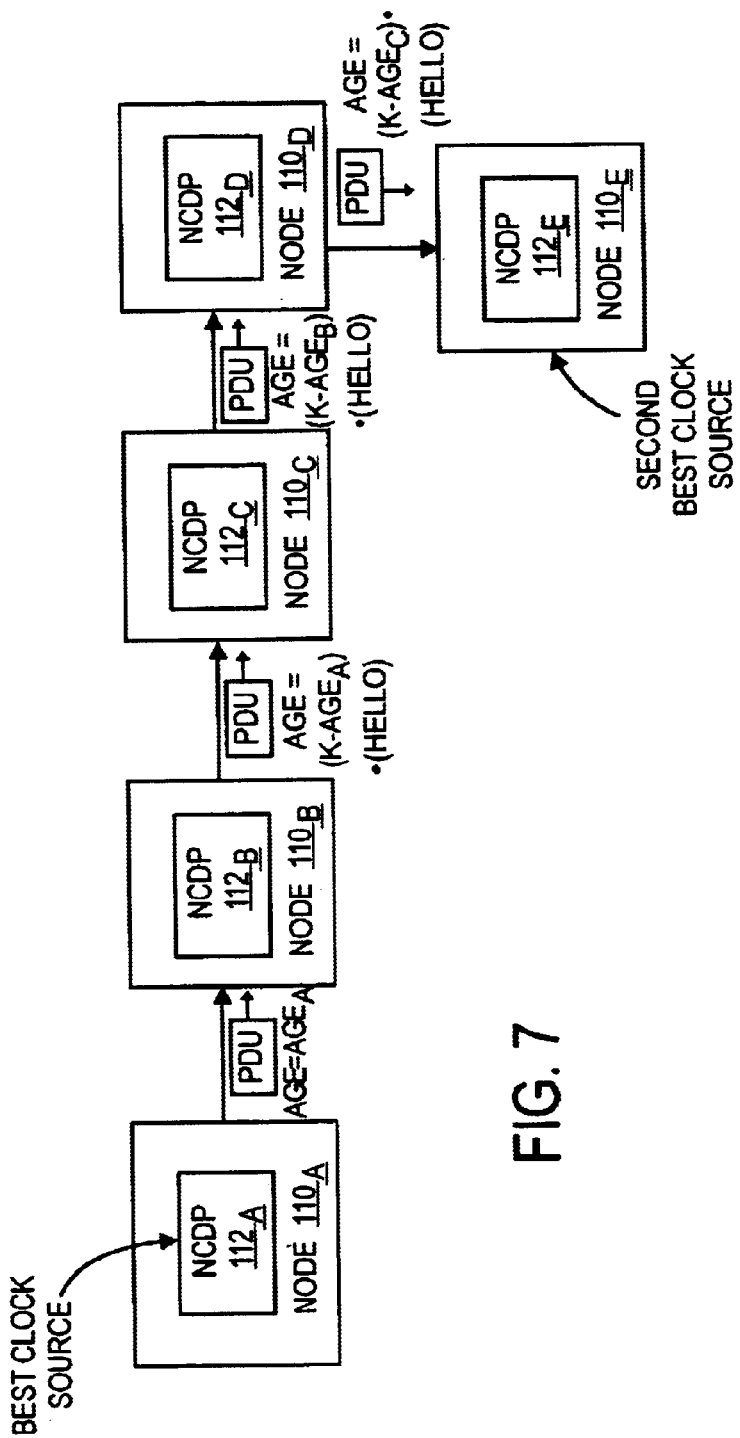
FIG. 7 illustrates an example of the exchange of PDUs having message age information within a network.

Now consider the situation depicted in FIG. 7. Here, assume that the network of nodes $110_A$–$110_E$ has been up and running for some time. Each node is configured with an associated instance of the NCDP software $112_A$–$112_E$. These NCDP entities have communicated to construct the network clock distribution tree illustrated in the figure, i.e., with node $110_A$ extracting clock from a "best" available source, node $110_B$ extracting clock from the link communicatively coupling it to node $110_A$, node $110_C$ extracting clock from the link communicatively coupling it to node $110_B$, node $110_D$ extracting clock from the link communicatively coupling it to node $110_C$, and node $110_E$ extracting clock from the link communicatively coupling it to node $110_D$. Node $110_E$ is also coupled to a link at which a "second best" network-wide clock source is available.

During steady-state operation, the nodes actively exchange configuration PDUs with one another. Here, the PDUs of interest are those messages received by nodes $110_B$, $110_C$, $110_D$ and $110_E$ on the links from which they extract clock information. When the root node $110_A$ (i.e., the node of the network at which the best network-wide clock source is available) sends a configuration message to node $110_B$, it inserts a "Message Age" parameter in the Message Age field 96 that is set equal to 0. When node 110B receives a configuration PDU from node $110_A$, node $110_B$ stops its message age timer that is associated with the interface on which the PDU was received and restarts it, using the Age value contained in the PDU. More particularly, in one embodiment node 110B will program its timer with a value equal to the network diameter parameter (K) less the message age ($Age_A$) specified in the PDU received from node $110_A$, multiplied by the hello time interval, so that the age parameter is specified in terms of hello time units. Then when node $110_B$ sends a configuration PDU to node $110_C$, the Message Age parameter specified in that PDU is calculated as:

$$Age_B = (K - Age_A)(\text{Hello Interval}).$$

Node $110_C$, in turn, sends a PDU to node $110_D$ with an Age parameter calculated in a similar form, and so on for each node, with each node refreshing its message age timer upon receipt of a configuration PDU.

Figure 8:
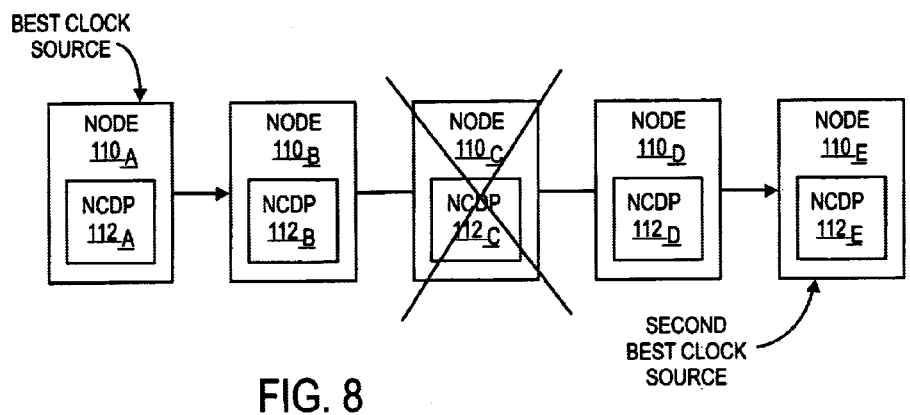
FIG. 8 illustrates an example of the effect of a node failure upon the exchange of PDUs within a network.

Now assume, as shown in FIG. 8, that node $110_C$ fails, thus partitioning the network into two smaller networks. Because node $110_D$ no longer receives configuration PDUs from node $110_C$, its message age timer associated with the link from node $110_C$ expires. Upon this expiration, node $110_D$ may revert to its unconverged state and reset its convergence counter. Note in addition that in the case where a node's NCDP entity is informed that a physical link has failed, then the NCDP entity enters the unconverged state and resets the convergence counter.

Figure 9:
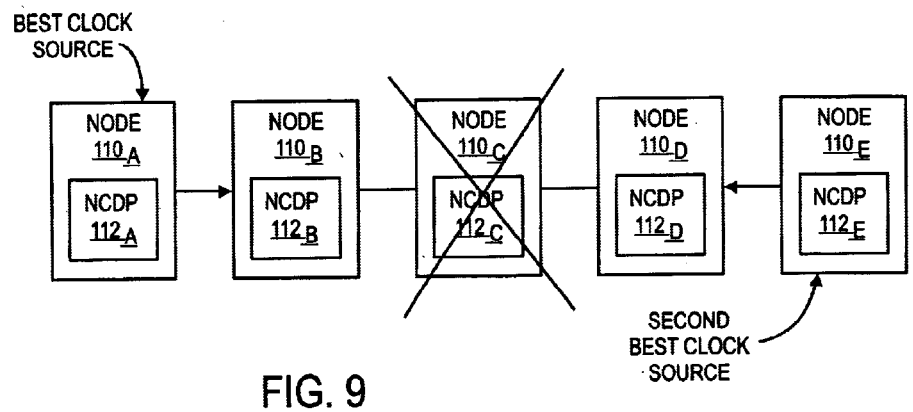
FIG. 9 illustrates an example of the rebuilding of a new clock distribution tree after a node failure within a network.

In its unconverged state, node $110_D$ begins advertising its best available clock source, in this case its internal oscillator. Information regarding this clock source will be passed to node $110_E$ (following the previously established clock distribution graph) in configuration PDUs. However, NCDP entity $112_E$, upon comparing this configuration information (i.e., the vector associated with node $110_D$'s internal oscillator) with that received regarding the "second best" available clock source, will recognize that node $110_D$'s internal oscillator is not the best possible clock source for the fragmented network consisting of nodes $110_D$ and $110_E$. Thus, node $110_E$ will enter its unconverged state and begin advertising information about this "second best" clock source to node $110_D$, as shown in FIG. 9.

Nodes $110_D$ and $110_E$ continue to exchange configuration PDUs in the fashion described above, until both nodes converge (and/or program their respective clock hardware components) with the "second best" clock source providing the PRS for this sub-network. Then, if node 10C is later repaired, the clock distribution tree will be rebuilt to its original for (see FIG. 6) as a result of the "best" clock source being advertised through the link from node $110_C$ to node $110_D$.

Figure 10:
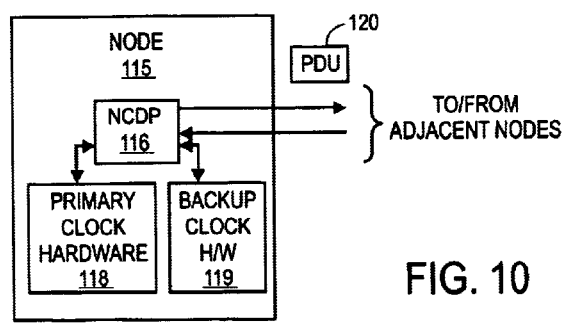
FIG. 10 illustrates an example of a node configured with a backup clock hardware module.
Figure 11:
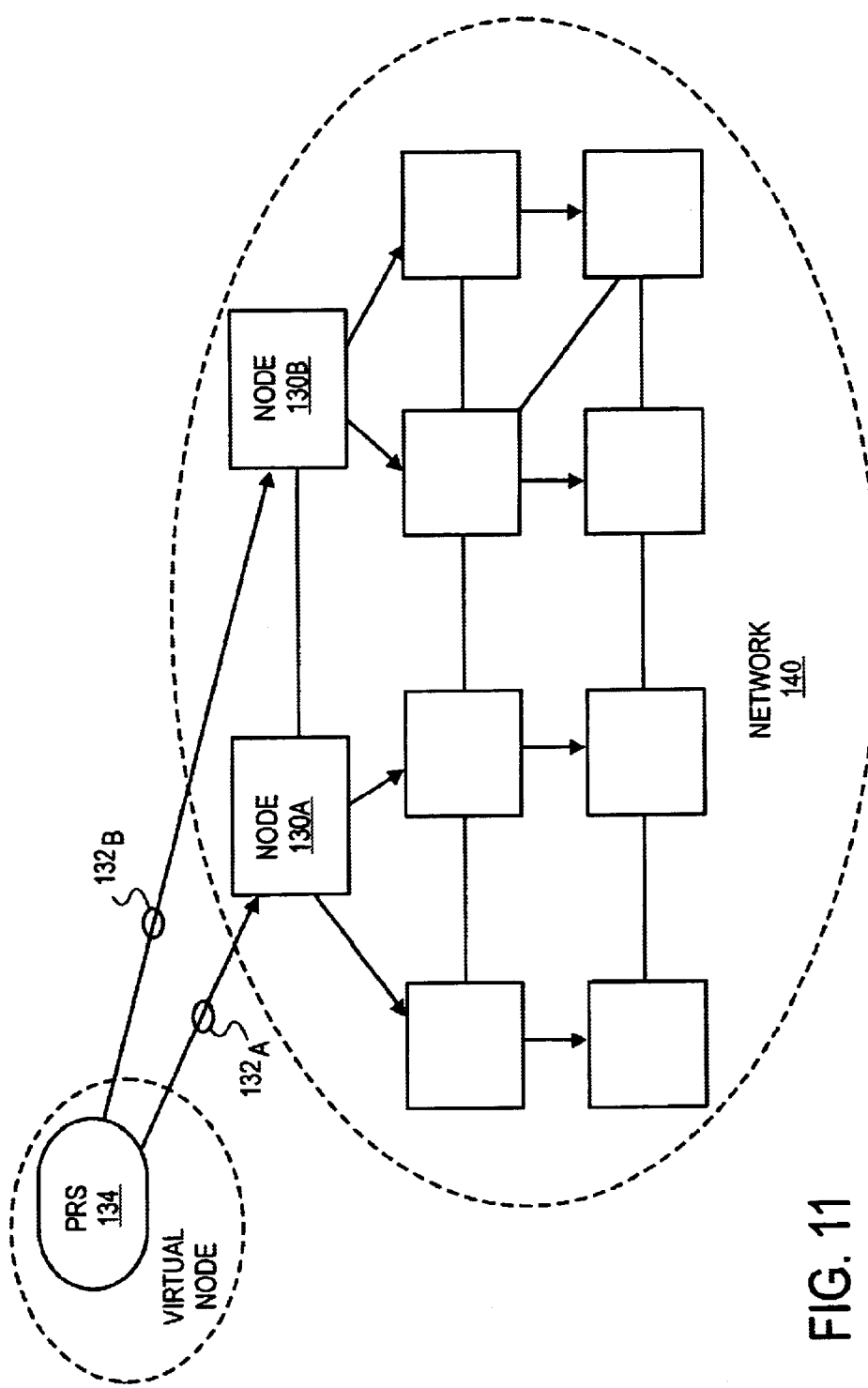
FIG. 11 illustrates an example of a virtual node.

Other features of the present scheme include the capability to support network nodes that include redundant clock hardware. For example, as shown in FIG. 10, some nodes 115 may include an NCDP instance 116 that is configured to operate with both a primary clock hardware module 118 and a backup clock hardware module 19. In such cases, the NCDP instance 116 may be configured to transmit configuration PDUs that include a "redundant" bit (e.g., as one of the Modifiers 68 or in a reserved field 98). The use of such a redundant bit allows node 115 to inform adjacent nodes of its backup clock hardware module 119. Further, the reserved field 98 may also include a "delay" field to be used in conjunction with the redundant bit. The delay field may be used by a node having redundant clock hardware to indicate the length of time (e.g., in seconds or portions thereof) it requires to switchover, thus providing the downstream nodes with additional information useful in determining whether to change the clock distribution graph.

One reason for allowing the NCDP instance 116 to inform adjacent nodes of the presence of the backup clock hardware module 119 is that it prevents adjacent nodes from making premature changes to its clock distribution graph in the event of a primary clock failure at node, 115. For example, if node 115 is providing clock for downstream nodes, those downstream nodes will construct clock distribution trees that extract clock from links coupling those nodes to node 115. Then, if node 115 experiences a failure of the primary clock unit 118, and as a result begins a switchover to the backup clock unit 119, the downstream nodes (having been informed of the presence of the backup clock unit) will not immediately start to search for a new clock source. That is, even if during the switchover process node 115 is unable to send configuration PDUs to its downstream nodes, those nodes will not immediately interpret the absence of these PDUs as an indication that they must search for a new clock source. Instead, the downstream nodes defer their search for a period of time (configurable by a network administrator) to allow node 115 to complete its switchover to the backup clock hardware module 119. Upon completion of this switchover, node 115 may resume transmitting PDUs and network operation may continue as if no switchover had occurred. Thus, the use of the redundant bit prevents two unnecessary reconstructions of the clock distribution tree, one which otherwise would have occurred when the primary clock hardware unit 118 failed and the other when the backup clock hardware unit 119 came on line.

Yet another feature of the network clock distribution scheme is the concept of a virtual clock source node. In some cases, it may be desirable to configure a network for clock distribution such that multiple links having clocking that originates from the same PRS are used simultaneously as clocking sources for the network. For example, as shown in FIG. 10, two links $132_A$ and $132_B$ may be used to couple two nodes $130_A$ and $130_B$, respectively, to the same external PRS 134. The network 140 is configured such that clock is extracted from both links $132_A$ and $132_B$ simultaneously. The result is that two clock distribution sub-trees that are rooted at the same virtual node (i.e., PRS 134) are created within the network 140. Thus, the virtual node concept allows multiple clock sources, traceable to the same PRS, to be configured for simultaneous clock extraction for a network. In doing so, the clock distribution tree is rooted at the virtual node and the nodes that attach to the virtual node become clock distribution sub-trees rooted at their point of attachment to the virtual node. By virtue of this concept, the clock distribution scheme is able to use any number of external clock sources for clock extraction, as long as they are all traceable to the same PRS.

In other cases, where a network includes both nodes configured for automatic clock selection/distribution and nodes configured for manual clock selection/distribution, any link on node that is configured for automatic configuration that attaches to a node that is configured for manual clock distribution will not be considered by the present selection scheme for inclusion into the spanning clock distribution scheme. This allows the present scheme to be introduced into networks that include nodes that require manual configuration. Thus a network clock synchronization scheme has been described. Although the foregoing description and accompanying figures discuss and illustrate specific embodiments, it should be appreciated that the present invention is to be measured only in terms of the claims that follow.

What is claimed is:

1. A method comprising establishing a clock distribution tree within a synchronous digital network through the use of spanning tree computations at n odes of the network, the computations relying, at least in part, upon the exchange of clock distribution messages between the nodes of the network, each clock distribution message including information regarding a clock source available at the source node of the message, said information indicating a priority level assigned to said clock source and a stratum level for said clock source.

2. The method of claim 1 wherein the clock distribution tree is hierarchical in nature, with nodes that are lower in the hierarchy extracting clock from links with nodes that are higher in the hierarchy.

3. The method of claim 2 wherein the spanning tree computations involve a root selection process and a convergence test.

4. The method of claim 3 wherein the root selection process is made on the basis of configuration vectors that are embedded within the clock distribution messages.

5. The method of claim 4 wherein the configuration vectors comprise a node stratum level and a primary reference source identifier.

6. The method of claim 5 wherein the convergence test comprises determining whether a number of clock distribution messages received or transmitted equals a network maximum diameter parameter for the network.

7. A method comprising automatically selecting at a node of a synchronous digital network a clocking source for the node according to a comparison of clock source configuration vectors, each vector associated with a port in the network and each vector identifying the associated port's priority, a stratum level of a clock source available at that port and an indication of a primary reference clock source for that port, at least one of the vectors having been: a) sent to the node by another node of the synchronous digital network; and, b) having been received by the node.

8. The method of claim 7 wherein other clock source configuration vectors are exchanged between other nodes of the network as part of an exchange of configuration messages.

9. The method of claim 8 wherein at least one of the configuration vectors is associated with a virtual node of the network.

10. The method of claim 8 wherein each node of the network is configured to extract clock information only from links to adjacent nodes at an equal or lower stratum level.

11. A set of computer-readable instructions, which when executed by a processor of a network node cause the processor to help establish a clock distribution tree for a synchronous digital network to which the node belongs by executing spanning tree computations that rely, at least in part, upon the exchange of clock distribution messages between the node and other nodes of the synchronous digital network, each clock distribution message including information regarding a clock source available at the source node of the message, said information indicating a priority level assigned to said clock source and a stratum level for said clock source.

12. The set of computer-readable instructions of claim 11 further comprising instructions that when executed by the processor cause the processor to ensure that the node extracts a clock only from links with nodes that are higher in a hierarchy of the network.

13. The set of computer readable instruction of claim 12 wherein the spanning tree computations involve a root selection process and a convergence test.

14. The set of computer-readable instructions of claim 13 wherein the root selection process is made on the basis of configuration vectors that are embedded within the clock distribution messages.

15. The set of computer-readable instructions of claim 14 wherein the configuration vectors comprise a node stratum level and a primary reference source identifier.

16. The set of computer-readable instructions of claim 15 wherein the convergence test comprises determining whether a number of clock distribution messages received or transmitted equals a network maximum diameter parameter for the network.

17. A synchronous network node comprising a processor and readable media having executable instructions to automatically select a clocking source for the node according to a comparison of clock source configuration vectors, each vector associated with a port in a network and each vector identifying the associated port's priority, a stratum level of a clock source available at that port and an indication of a primary reference clock source for that port, at least one of the vectors having been: a) sent to the node by another node of the synchronous digital network, and, b) having been received by the node.

18. The network node of claim 17 wherein the other clock source configuration vectors are exchanged between other nodes of the network as part of an exchange of configuration messages.

19. The network node of claim 18 wherein at least one of the configuration vectors is associated with a virtual node of the network.

20. The network node of claim 18 being further configured to extract clock information only from links to adjacent nodes at an equal or lower stratum level.

21. A method to recognize a root clock source for a synchronous network, said method comprising:
   a) receiving, at a second node that is part of said synchronous network, a message that was sent from a first node, said first node also part of said synchronous network, said message comprising:
      (i) an indication of a first priority level assigned to a first clocking signal, said first clocking signal recognized by said first node as said root clock source when said message was sent by said first node, said first clocking signal found at a first port within said network and (ii) an indication of a stratum level for said first clocking signal; and, b) comparing, by said second node, said first priority level against a second priority level, said second priority level assigned to a second clocking signal, said second signal recognized by said second node as said root clock source.

22. The method of claim 21 further comprising identifying, at said second node, said first clocking signal as said root clock source because said first priority level is higher in priority than said second priority level.

23. The method of claim 22 wherein said first priority level being higher in priority than said second priority level causes said second node to transition from a converged state to an unconverged state.

24. The method of claim 23 further comprising recognizing at said second node that a selection process for determining said root clock source has converged.

25. The method of claim 24 wherein said recognizing further comprises recognizing at said second node that a specific number of messages have been received that each indicate the same root clock source.

26. The method of claim 21 further comprising keeping said recognition, at said second node, that said second clocking signal is said root clock source because said first priority level is lower in priority than said second priority level.

27. The method of claim 21 wherein said first priority level is the same as said second priority level and wherein said method further comprises comparing, by said second node, said indication of said stratum level for said first clocking signal against an indication of a stratum level for said second clocking signal.

28. The method of claim 27 further comprising identifying, at said second node, said first clocking signal as said root clock source because said stratum level for said first clocking signal is lower than said stratum level for said second clocking signal.

29. The method of claim 28 further comprising recognizing at said second node that a s election process for determining said root clock source has converged.

30. The method of claim 29 wherein said recognizing further comprises recognizing at said second node that a specific number of messages have been received that each indicate the same root clock source.

31. The method of claim 27 further comprising keeping said recognition, at said second node, that said second clocking signal is said root clock source because said stratum level for said first clocking signal is higher than said stratum level for said second clocking signal.

32. The method of claim 27 wherein said stratum level for said first clocking signal is the same as said stratum level for said second clocking signal, and wherein said message further comprises an indication as to whether said first clocking signal is internally or externally generated relative to said network.

33. The method of claim 32 further comprising identifying, at said second node, said first clocking signal as said root clock source because said first clocking signal is externally generated relative to said network and said second clocking signal is internally generated relative to said network.

34. The method of claim 33 further comprising recognizing at said second node that a selection process for determining said root clock source has converged.

35. The method of claim 34 wherein said recognizing further comprises recognizing at said second node that a specific number of messages have been received that each indicate the same root clock source.

36. The method of claim 32 further comprising keeping said recognition, at said second node, that said second clocking signal is said root clock source because said second clocking signal is externally generated relative to said network and said first clocking signal is internally generated relative to said network.

37. The method of claim 21 wherein said second node is within an unconverged state.

38. The method of claim 21 wherein said message further comprises information that informs said second node of the best clock available to and usable by said first node.

39. The method of claim 38 further comprising selecting a root port for said second node, said root port being a port where a link resides having a clocking signal that is extracted by said second node.

40. The method of claim of claim 39 further comprising configuring said second node's clocking hardware to extract a clock at said root port.

41. The method of claim 39 wherein said selecting a root port further comprises:

receiving messages from adjacent nodes, each message indicating the stratum level of its respective adjacent node; and, refusing to use, as said root port, a port of said second node where a link resides that communicates to those of said adjacent ports having a higher stratum level than said second node.

42. A set of computer-readable instructions which, when executed by a processor of a second node that is part of a synchronous network, cause said processor to perform a method that identifies a root clock source for said synchronous network, said method comprising comparing a first priority level against a second priority level, said first priority level assigned to a first clocking signal, said first clocking signal found at a first port within said network, said first node having sent a message to said second node that included an indication o f said first priority level and an indication of a stratum level for said first clocking signal, said first node having recognized said first clocking signal as said root clock source when said message was sent, said second priority level assigned to a second clocking signal, said second clocking signal recognized by said second node as said root clock source.

43. The set of computer-readable instructions of claim 42 wherein said method further comprises identifying said first clocking signal as said root clock source because said first priority level is higher in priority than said second priority level.

44. The set of computer-readable instructions of claim 43 wherein said first priority level being higher in priority than said second priority level causes said second node to transition from a converged state to an unconverged state.

45. The set of computer-readable instructions of claim 43 wherein said method further comprises recognizing that a selection process for determining said root clock source has converged.

46. The set of computer-readable instructions of claim 45 wherein said recognizing further comprises recognizing that a specific number of messages have been received and wherein each of said messages indicate the same root clock source.

47. The set of computer-readable instructions of claim 42 wherein said method further comprises keeping said recognition that said second clocking signal is said root clock source because said first priority level is lower in priority than said second priority level.

48. The set of computer-readable instructions of claim 42 wherein said method further comprises comparing said indication of said stratum level for said first clocking signal against an indication of a stratum level for said second clocking signal if said first priority level is the same as said second priority level.

49. The set of computer-readable instructions of claim 48 wherein said method further comprises identifying said first clocking signal as said root clock source because said stratum level for said first clocking signal is lower than said stratum level for said second clocking signal.

50. The set of computer-readable instructions of claim 49 wherein said method further comprises recognizing that a selection process for determining said root clock source has converged.

51. The set of computer-readable instructions of claim 50 wherein said recognizing further comprises recognizing that a specific number of messages have been received and wherein each of said messages indicate the same root clock source.

52. The set of computer-readable instructions of claim 48 wherein said method further comprises keeping said recognition that said second clocking signal is said root clock source because said stratum level for said first clocking signal is higher than said stratum level for said second clocking signal.

53. The set of computer-readable instructions of claim 48 wherein said method further comprises, if said stratum level for said first clocking signal is the same as said stratum level for said second clocking signal, identifying said first clocking signal as said root clock source because said first clocking signal is externally generated relative to said network and said second clocking signal is internally generated relative to said network, and wherein, said message further comprised an indication as to whether said first clocking signal is internally or externally generated relative to said network.

54. The set of computer-readable instructions of claim 53 wherein said method further comprises recognizing that a selection process for determining said root clock source has converged.

55. The set of computer-readable instructions of claim 54 wherein said recognizing further comprises recognizing that a specific number of messages have been received and wherein each of said messages indicate the same root clock source.

56. The set of computer-readable instructions of claim 48 wherein said method further comprises, if said stratum level for said first clocking signal is the same as said stratum level for said second clocking signal, keeping said second clocking signal as said root clock source because said first clocking signal is internally generated relative to said network and said second clocking signal is externally generated relative to said network, and wherein, said message further comprised an indication as to whether said first clocking signal is internally or externally generated relative to said network.

57. The set of computer-readable instructions of claim 42 wherein said second node may be within an unconverged state or a converged state.

58. The set of computer-readable instructions of claim 42 wherein said message further comprises information that informs said second node of the best clock available to and usable by said first node.

59. The set of computer-readable instructions of claim 58 wherein said method further comprises selecting a root port for said second node, said root port being a port where a link resides having a clocking signal that is extracted by said second node.

60. The set of computer-readable instructions of claim 59 wherein said method further comprises configuring said second node's clocking hardware to extract a clock at said root port.

61. The set of computer-readable instructions of claim 59 wherein said selecting a root port further comprises:
receiving messages from adjacent nodes, each message indicating the stratum level of its respective adjacent node; and, refusing to use, as said root port, a port of said second node where a link resides that communicates to those of said adjacent ports having a higher stratum level than said second node.

62. A second node, said second node capable of being part of a synchronous network, said second node comprising:
a) means for receiving a message that was sent from a first node, said first node also part of said synchronous network, said message comprising:
(i) an indication of a first priority level for a first clocking signal, said first clocking signal recognized by said first node as a root clock source for said network when said message was sent, said first clocking signal found at a first port within said network and
(ii) an indication of a stratum level for said first clocking signal; and,
b) means for comparing said first priority level against a second priority level, said second priority level for a second clocking signal, said second clocking signal recognized by said second node as said root clock source.

63. The second node of claim 62 further comprising means for identifying said first clocking signal as said root clock source because said first priority level is higher in priority than said second priority level.

64. The second node of claim 62 further comprising means for comparing a first indication against a second indication if said first priority level is the same as said second priority level, wherein, said message further comprises said first indication, said first indication indicative of a first stratum level, said first stratum level being the stratum level for said first clocking signal, said second indication indicating the stratum level for said second clocking signal.

65. The second node of claim 64 further comprising means for identifying said first clocking signal as said root clock source because said stratum level for said first clocking signal is lower than said stratum level for said second clocking signal.

66. The second node of claim 64 further comprising means for identifying, if said first stratum level is the same as said second stratum level, said first clocking signal as said root clock source because said first clocking signal is externally generated relative to said network and said second clocking signal is internally generated relative to said network.

67. The second node of claim 62 wherein said message further comprises information that informs said second node of the best clock available to and usable by said first node.

68. The second node of claim 67 further comprising means for selecting a root port for said second node, said root port being a port where a link resides having a clocking signal that is extracted by said second node.

69. The second node of claim 68 further comprising means for configuring said second node's clocking hardware to extract a clock at said root port.

70. An apparatus that can be used to implement a node within a synchronous digital network, said apparatus comprising a network clock distribution protocol entity, said network clock distribution protocol entity to identify a root clock source of said network, said network clock distribution protocol entity to send messages that contain:
- (i) an indication of a priority level of a clocking source that is recognized by said network clock distribution protocol entity as said root clock source; and,
- (ii) an indication of a stratum level of said clocking source.

71. The apparatus of claim 70 wherein said apparatus is a switch.

72. The apparatus of claim 70 wherein said network clock distribution protocol is implemented with software.

73. The apparatus of claim 70 wherein said apparatus further comprises installed network clock hardware.

74. The apparatus of claim 70 wherein said messages further contain an indication whether said recognized root clock source is an internal clock source or an external clock source.

75. The apparatus of claim 74 wherein said messages further contain an indication of a stratum level of said node.

76. The apparatus of claim 75 wherein said messages further contain a network address of said node.

* * * * *